(12) United States Patent
Soik et al.

(10) Patent No.: US 10,974,778 B2
(45) Date of Patent: Apr. 13, 2021

(54) TRACK MOUNTING TOOL

(71) Applicant: Clark Equipment Company, West Fargo, ND (US)

(72) Inventors: Austin Soik, Hillman, MI (US); Anthony Brechting, Comstock Park, MI (US); Daniel Domitrovich, Ontonagon, MI (US); Joseph Fordahl, Holland, MI (US); Andrew Jensen, Maple Grove, MN (US); Patrick Anderson, Dickinson, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 216 days.

(21) Appl. No.: 16/044,800

(22) Filed: Jul. 25, 2018

(65) Prior Publication Data

US 2019/0031258 A1    Jan. 31, 2019

Related U.S. Application Data

(60) Provisional application No. 62/536,703, filed on Jul. 25, 2017.

(51) Int. Cl.
*B62D 55/32* (2006.01)
*B62D 55/24* (2006.01)

(52) U.S. Cl.
CPC ............ *B62D 55/32* (2013.01); *B62D 55/244* (2013.01)

(58) Field of Classification Search
CPC ............................... B62D 55/32; B62D 55/244
See application file for complete search history.

(56) References Cited

U.S. PATENT DOCUMENTS

| | | | | |
|---|---|---|---|---|
| 1,131,018 A | * | 3/1915 | Troutman | B66F 13/00 254/85 |
| 3,048,917 A | | 8/1962 | Slaughter | |
| 4,167,058 A | * | 9/1979 | Janssen | B62D 55/32 29/822 |
| 4,283,828 A | * | 8/1981 | Cole, Sr. | B25B 27/22 254/100 |
| 4,486,936 A | * | 12/1984 | Curry | B60B 29/00 254/124 |
| 4,683,632 A | | 8/1987 | Kalman | |
| 5,259,821 A | | 11/1993 | Bryant | |
| 5,839,239 A | * | 11/1998 | Jang | B66F 7/20 52/123.1 |
| 6,654,994 B2 | | 12/2003 | LaFevers | |
| 6,662,421 B1 | * | 12/2003 | Krippelz, Sr. | B25B 27/0035 248/229.12 |
| 6,874,739 B1 | * | 4/2005 | Gregory | B66F 3/08 248/188.4 |
| 6,922,881 B2 | | 8/2005 | LeFevers | |

(Continued)

*Primary Examiner* — Bayan Salone
(74) *Attorney, Agent, or Firm* — John Veldhuis-Kroeze; Westman, Champlin & Koehler, P.A.

(57) ABSTRACT

Disclosed are embodiments of a track mounting tool for use with track removal from, and mounting on, a power machine. The tool includes features which aid in the tasks of track removal and/or track installation. In exemplary embodiments, the tool includes track hanger towers which are configurable to carry a track for mounting on, or after removal from, either side of a power machine. The tool includes a track engager mechanism, which is pivotable for use with either side of a power machine or for mounting of a track at a front or rear idler.

17 Claims, 9 Drawing Sheets

(56) References Cited

U.S. PATENT DOCUMENTS

| | | | | |
|---|---|---|---|---|
| 7,310,864 | B1* | 12/2007 | Gingerich | B25B 1/103 |
| | | | | 269/147 |
| 7,634,899 | B2* | 12/2009 | Otter | B21L 21/00 |
| | | | | 254/100 |
| 9,260,146 | B2* | 2/2016 | Bair | B62D 55/32 |
| 9,981,704 | B2* | 5/2018 | Campbell | B62D 55/32 |
| 10,683,044 | B2* | 6/2020 | Campbell | B62D 55/32 |
| 2009/0183489 | A1* | 7/2009 | Otter | B21L 21/00 |
| | | | | 59/7 |
| 2013/0239405 | A1* | 9/2013 | Griffith | B23P 6/00 |
| | | | | 29/700 |
| 2015/0375815 | A1* | 12/2015 | Ramaiyan | B23P 19/022 |
| | | | | 29/252 |
| 2016/0194040 | A1 | 7/2016 | Bair | |
| 2016/0214665 | A1 | 7/2016 | Campbell et al. | |

\* cited by examiner

TRACK MOUNTING TOOL

CROSS-REFERENCE TO RELATED APPLICATION

This application claims the benefit of U.S. Provisional Application No. 62/536,703, which was filed on Jul. 25, 2017.

BACKGROUND

This disclosure is directed toward tools for use with power machines having tracks. More particularly, this disclosure is directed to a tool configured to be used in removing tracks from, and installing tracks on, power machines such as loaders.

Power machines, for the purposes of this disclosure, include any type of machine that generates power to accomplish a particular task or a variety of tasks. One type of power machine is a work vehicle. Work vehicles are generally self-propelled vehicles that have a work element, such as a lift arm (although some work vehicles can have other work element) that can be manipulated to perform a work function. Work vehicles include excavators, loaders, utility vehicles, tractors, and trenchers, to name a few examples.

Some power machines, such as loaders and excavators, can have tracks mounted on either side of a machine frame. Endless tracks are powered about track frames on which the tracks are carried. A set of rollers or bogie wheels are typically attached to the track frames and engage the endless tracks to distribute the weight of the machine over that portion of the track that is in engagement with the ground. One or more tensioning devices, such as tensioning cylinders, are employed with idlers to maintain a desirable tension on the endless tracks. A drive sprocket engages each endless track to power the track and move the power machine over a surface.

On power machines, the endless tracks at times require removal and replacement. However, due to the weight of a typical track, often hundreds of pounds, and the tension placed on the track by the idlers and corresponding tensioning devices, track removal and installation can be a challenging, labor intensive task.

The discussion above is merely provided for general background information and is not intended to be used as an aid in determining the scope of the claimed subject matter.

SUMMARY

Disclosed are embodiments of a track mounting tool for use with track removal from, and installation on, a power machine. The tool includes a variety of features which aid in the tasks of track removal and/or track installation. In exemplary embodiments, the tool includes track hanger towers which are configurable to carry a track for installation on, or after removal from, either side of a power machine. In exemplary embodiments, the tool includes a track engager, which is pivotable for use with either side of a power machine or for installation of a track at a front or rear idler.

In some exemplary embodiments, the disclosed tool includes a rail guard to prevent excessive deflection under load of a rail of the track engager. In some exemplary embodiments, a method of using a tool to remove a track from a track frame assembly of a power machine is disclosed. In some exemplary embodiments, a method of using a tool to install a track on a track frame assembly of a power machine is disclosed.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed embodiments include a tool for use with track removal and installation from a power machine. The tool includes a variety of features which aid in the tasks of track removal and/or track installation. For example, the tool includes moveable track hanger towers which are configurable to carry a track for installation on, or after removal from, either side of a power machine. Another example feature of some exemplary embodiments is a track engager mechanism, which is pivotable for use with either side of a power machine or for installation of a track at a front or rear idler. Yet another feature includes a configurable rail guard to prevent excessive deflection under load of a rail of the track engager mechanism. Still other exemplary features of embodiments of the tool are described in the following disclosure.

Figure 1:
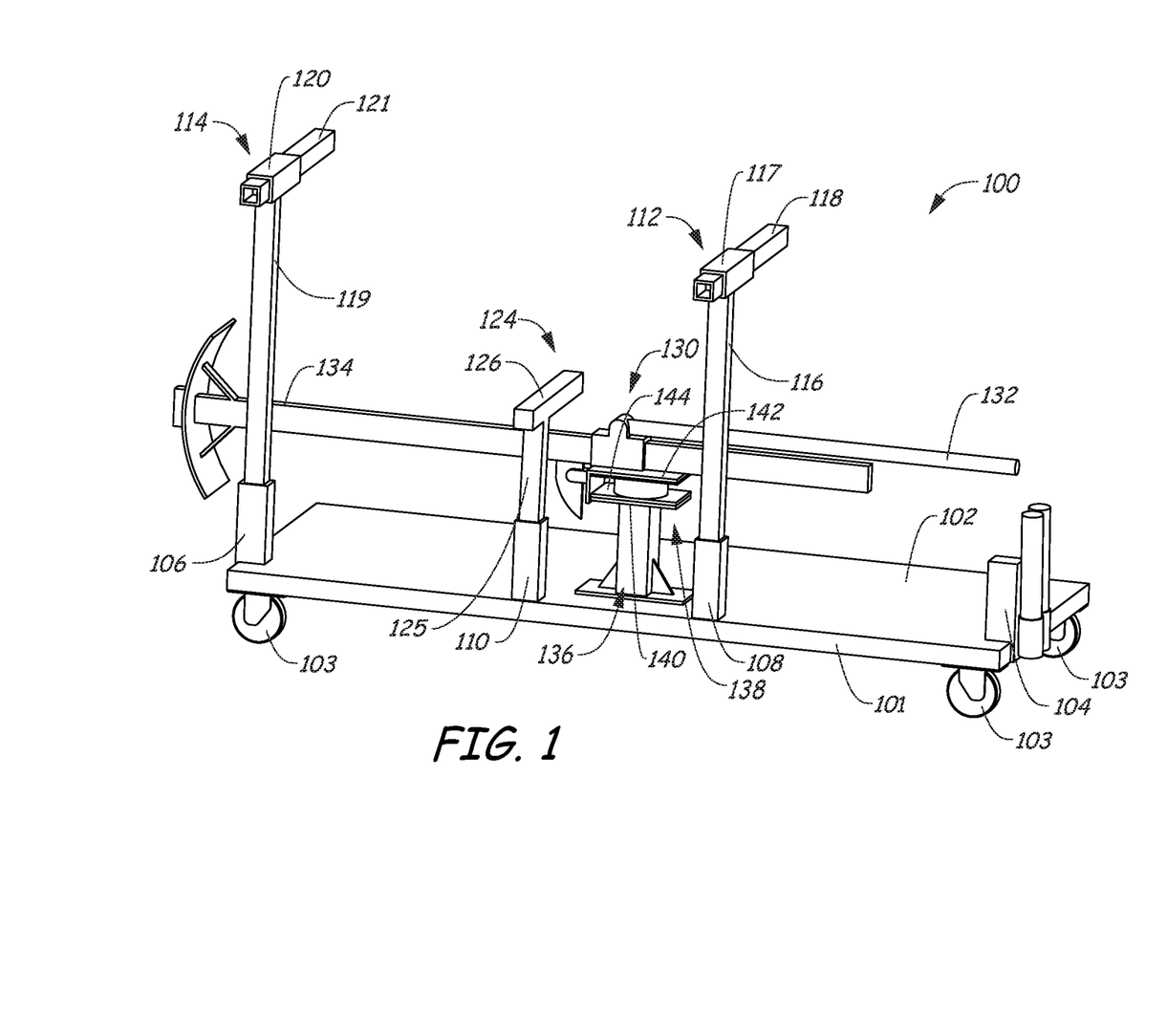
FIG. 1 is a diagrammatic perspective view of a track mounting tool in accordance with an exemplary embodiment.

FIG. 1 is a diagrammatic perspective view of a track installer tool 100 in accordance with some exemplary embodiments. Track installer tool 100 includes a base 102, mounted on a set of wheels 103. Wheels 103 can be, for example, caster wheels which allow tool 100 to be moved for use in removal of a track from a power machine, as well as for installation of a new track on a power machine. In some exemplary embodiments, the base 102 is generally planar and horizontally extending to allow the base to be partially positioned underneath of a track frame of the power machine during installation and removal of a track.

Embodiments of track installer tools such as tool 100 include multiple tower mounts configured to receive vertically extending towers for use in the track installation or removal processes. As shown in FIG. 1, tool 100 includes tower mounts 104, 106, 108 and 110. Tower mounts 104 and 106 are welded, attached or otherwise secured at first and second end positions of base 102, while tower mounts 108 and 110 are welded, attached or otherwise secured at interior positions of base 102. By spacing tower mounts 104, 106, 108 and 110 as illustrated, tool 100 is configurable for use on both sides of a power machine, as will be discussed below. In other embodiments, additional tower mounts can be included with tool 100 to facilitate the use of the tool with different sizes of power machines. Also, as illustrated in FIG. 1, in some exemplary embodiments tower mounts 104 and 106 are positioned slightly offset from a rear edge 101 of base 102, while tower mounts 108 and 110 are positioned at rear edge. In various embodiments, while tower mounts will generally be positioned at, near or adjacent to rear edge 101 of base 102 to allow base 102 to be positionable underneath of a track frame, the positioning of tower mounts on base 102 can be selected to optimize use of tool 100 on a particular power machine.

Tool 100 includes first and second track hanger towers 112 and 114, which can be removably positioned within different ones of the tower mounts 104, 106, 108 and 110. As shown, track hanger tower 112 is positioned within tower mount 108 while track hanger tower 114 is positioned within tower mount 106. Track hanger tower 112 includes a vertically extending member 116 configured to be positioned within a tower mount and a horizontally extending hanger member 118 attached or secured to the vertically extending member 116. Connection mechanism 117 detachably secures horizontally extending hanger member 118 to vertically extending member 116 with a tube and locking pin arrangement as shown in FIG. 2.

Figure 2:
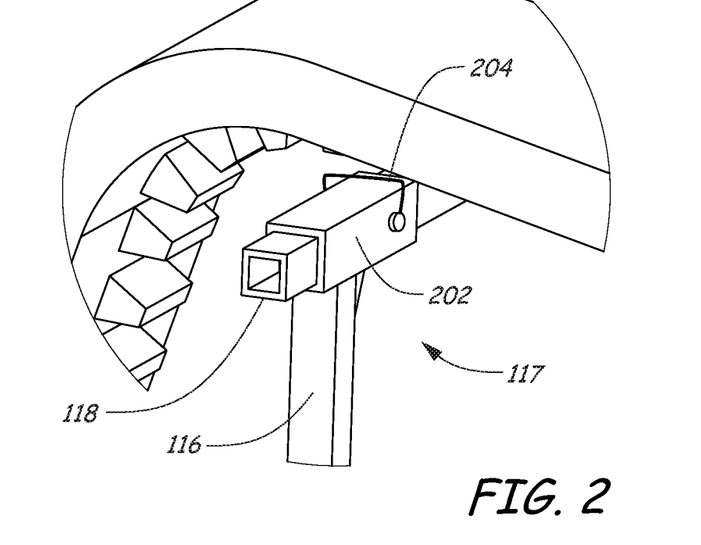
FIG. 2 is a diagrammatic perspective view of an embodiment of a connection mechanism allowing a hanger member of the tool shown in FIG. 1 to be removed from a vertically extending member for storage.

FIG. 2 illustrates connection mechanism 117 including a tube 202 and locking pin 204, which allows hanger member 118 to be removed from vertically extending member 116 to allow for storage or different length hanger members to be utilized with vertically extending member 116. The locking pin mechanism provides an exemplary connection of hanger member 118. However, connection mechanism 117 can provide other connection schemes of hanger member 118 or allow for a hinged connection to aid in storage of the track hanger towers. Track hanger tower 114 (shown in FIG. 1) is similarly configured, with a vertically extending member 119, a connection mechanism 120, and a horizontally extending hanger member 121. Vertically extending members 116 and 119 are of different lengths such that track hanger tower 114 is taller than track hanger tower 112, though this need not be the case in all embodiments. Connection mechanisms 117 and 120 are disclosed such that hanger members 118 and 121 are removable from vertically extending members 116 and 119. In alternative embodiments, the track hanger members can be welded or otherwise permanently secured to the vertically extending members.

While tower mounts 104, 106, 108 and 110 are shown welded or otherwise secured to base 102 in a manner that is considered permanent for use of tool 100, in other embodiments, some of the tower mounts and/or the track hanger towers can be welded or secured to other platforms (not shown), with the other platforms being configured to be bolted onto base 102 at different positions for different sized power machines. This design allows tool 100 to be reconfigured as needed to accommodate different sizes of machines and track frames.

Tool 100 includes an extendable track engager 130 having a handle 132 and a rail 134 with a series of apertures formed therethrough. A center mount 136 of the track engager 130 is mounted to the base 102 and carries the rail therein. The center mount 136 includes a mechanism to engage and hold the rail 134 via one or more of the apertures formed in the rail to hold the rail in a selected position. A shoe 135 is mounted at an end of rail 134. Shoe 135 is shaped in an arc to engage an inside surface of a track. Actuation of handle 132 causes the center mount to force the rail 134 and by extension, shoe 135, to extend away from center mount 136. This allows shoe 135 to engage and stretch a track as will be described below in greater detail. In exemplary embodiments, shoe 135 has a radius of curvature which is larger than a radius of curvature of an idler or wheel over which the track will be installed such that the track can more easily be installed on the idler.

Figure 3:
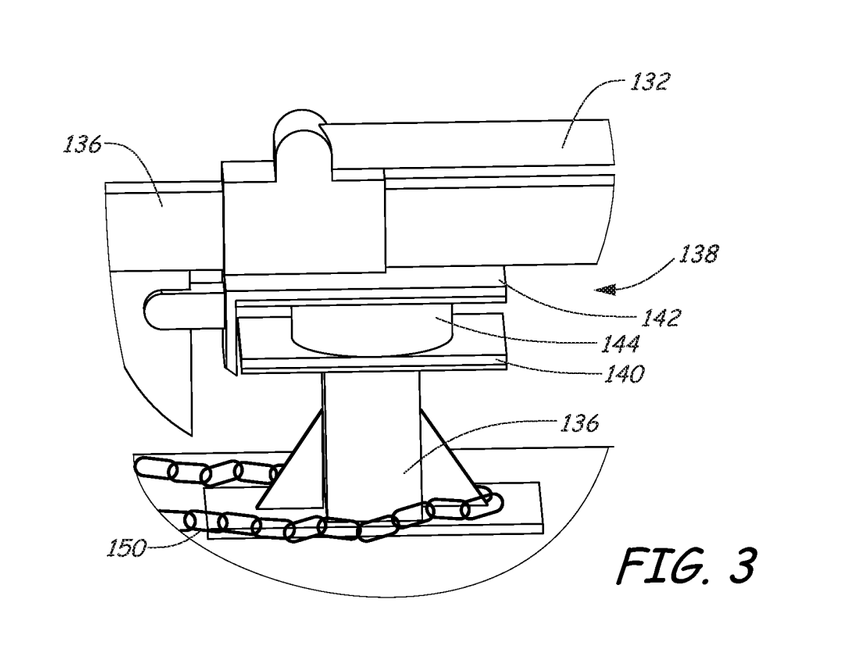
FIG. 3 is a diagrammatic view of a pivot mechanism connecting a track engager with a mount in some embodiments of the tool shown in FIG. 1.

In exemplary embodiments, the attachment between the rail 134 of the track engager 130 and center mount 136 is provided at least partially by a pivot mechanism 138. As also shown in FIG. 3, pivot mechanism 138 can be a turntable device having a first plate 140 mounted on or otherwise rigidly attached to center mount 136, a second plate 142 attached to components supporting the rail 134 of the track engager 130, and a ring bearing 144 rotatably coupling first plate 140 to second plate 142. Other types of pivot mechanisms can be used as well. For example, in alternative embodiments, a base plate which pivots with the track engager could be mounted to the center mount using bolts and oblong or arcuate holes or slots to allow the pivotal movement of the track engager.

Utilizing a pivot mechanism 138 to attach or couple the rail 134 of the track engager 130 to center mount 136 allows the rail to be rotated to extend rail 134 and shoe 135 in either direction. When working on one side of a power machine, this allows pushing of either of the front and rear of the track when stretching the track for installation. It also allows tool 100 to be used to install tracks on both sides of the power machine. Further, utilizing pivot mechanism 138 to mount track engager 130 on tool 100 allows the track engager to be aligned with the track initially, and to pivot to maintain alignment as the track is being stretched.

Figure 4:
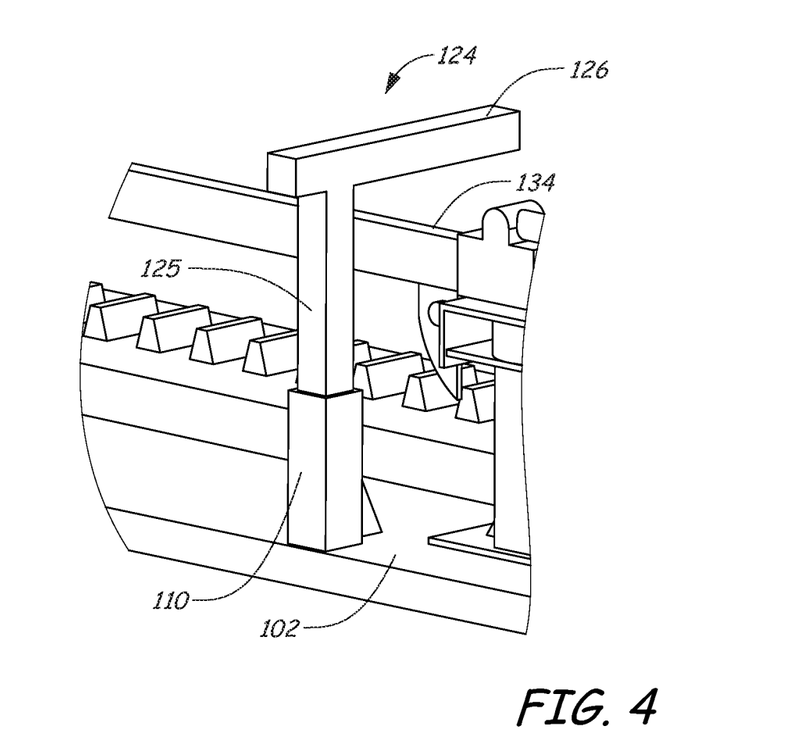
FIG. 4 is a diagrammatic perspective view of a rail guard in an exemplary embodiment of the tool shown in FIG. 1.

FIGS. 1 and 4 illustrate a rail guard post tower 124 of tool 100. Rail guard post tower 124 has a vertically extending member 125 and a horizontally extending member 126. In some embodiments, vertically extending member 125 is intended to be inserted and secured (such as by being pinned or welded to, for example, one of the tower mounts on base 102, and preferably on one of interior tower mounts 108 and 110. As shown, vertically extending member 125 of rail guard post tower 124 is inserted in tower mount 110. Rail guard post tower 124 has a height which places horizontally extending member 126 slightly above rail 134 when vertical member 125 is positioned in the corresponding tower mount 108 or 110 (depending upon the direction track engager 130 is oriented to extend rail 134). When pushing rail 134 such that shoe 135 engages a track, rail 134 will be acted upon by deflecting forces. Horizontally extending member 126 of rail guard 124 provides an upper limit on the amount that rail 134 can upwardly deflect. Although not shown in FIG. 1, in other embodiments, rail guard 124 can include a second horizontally extending member beneath rail 134 to limit deflection of the rail downwardly as well. In some embodiments, no rail guard is provided.

Figure 5:
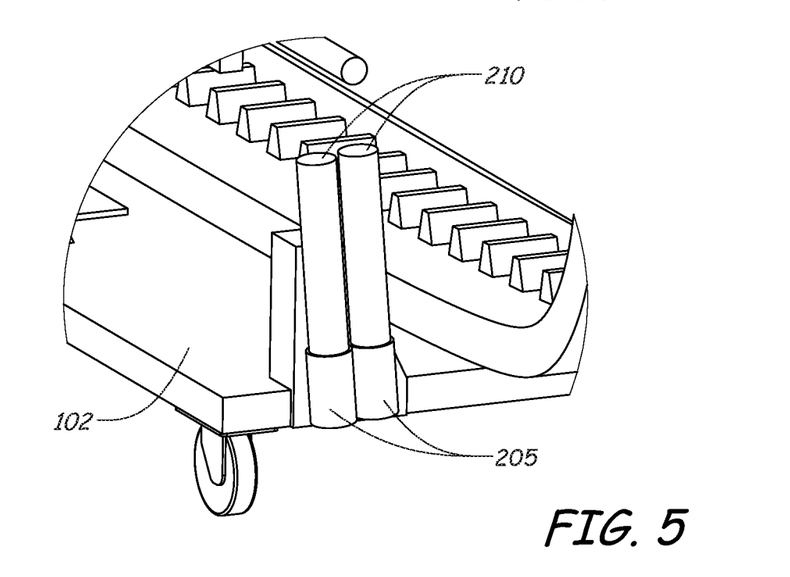
FIG. 5 is a diagrammatic illustration of a dowel pin holder feature of some embodiments of the tool shown in FIG. 1.
Figure 6:
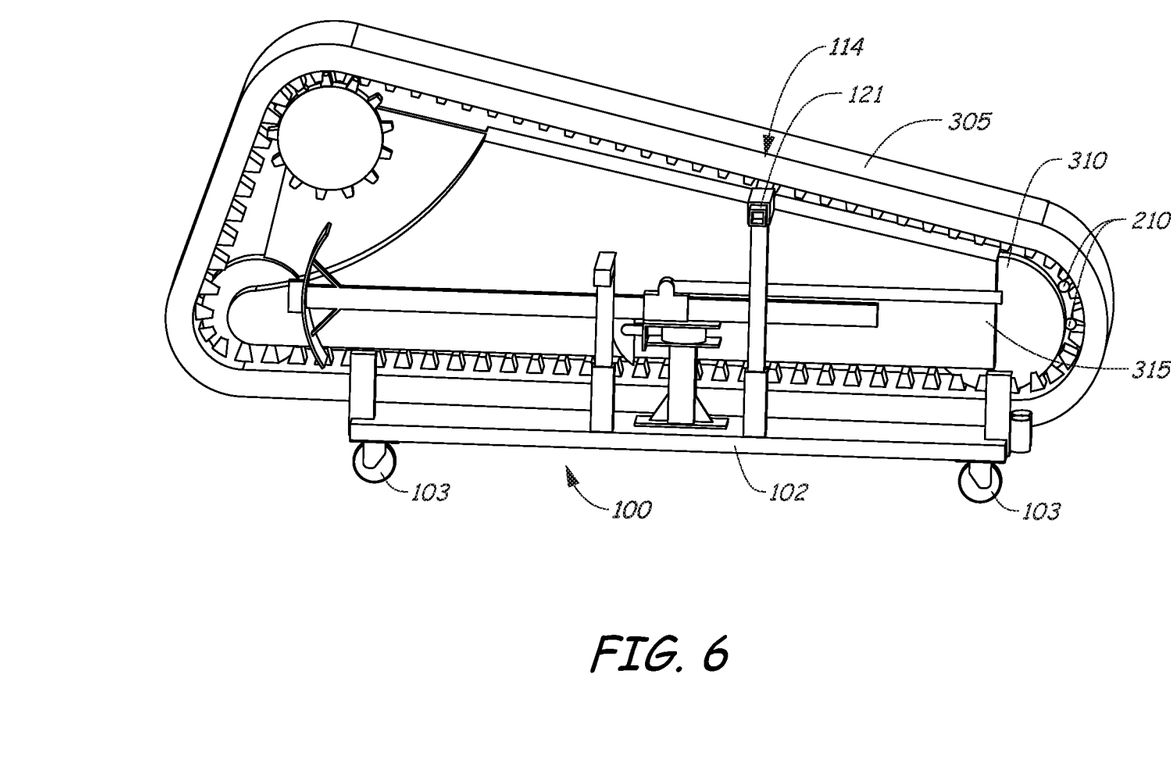
FIG. 6 is a diagrammatic illustration of the tool shown in FIG. 1 used during track removal.

In some embodiments, as shown in FIG. 5, dowel pin holders 205 are included on base 102 to store dowel pins 210 commonly used in the removal of a track from a power machine. In many track assemblies, a tensioning cylinder acts against an idler (such as idler 310 of FIG. 6) to cause the idler to exert a force against a track and prevent the track from de-tracking. The dowel rods 210, which are shown in use in FIG. 6, are inserted between a track 305 and idler 310 of track frame assembly 315 to retract the a previously de-pressurized tensioning cylinder, allowing the track to be pried off the track frame assembly 315.

Figure 7:
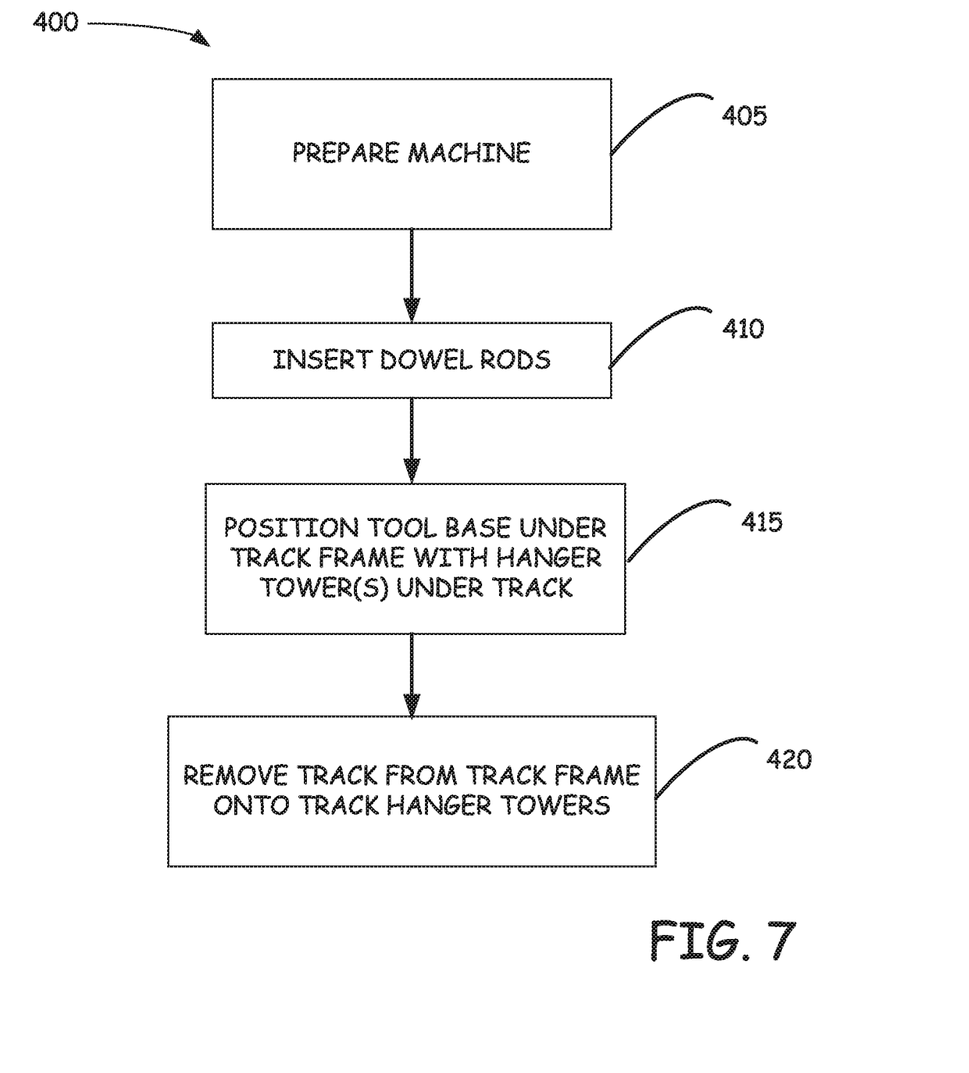
FIG. 7 is a flow diagram illustrating a track removal method in accordance with an exemplary embodiment.
Figure 8:
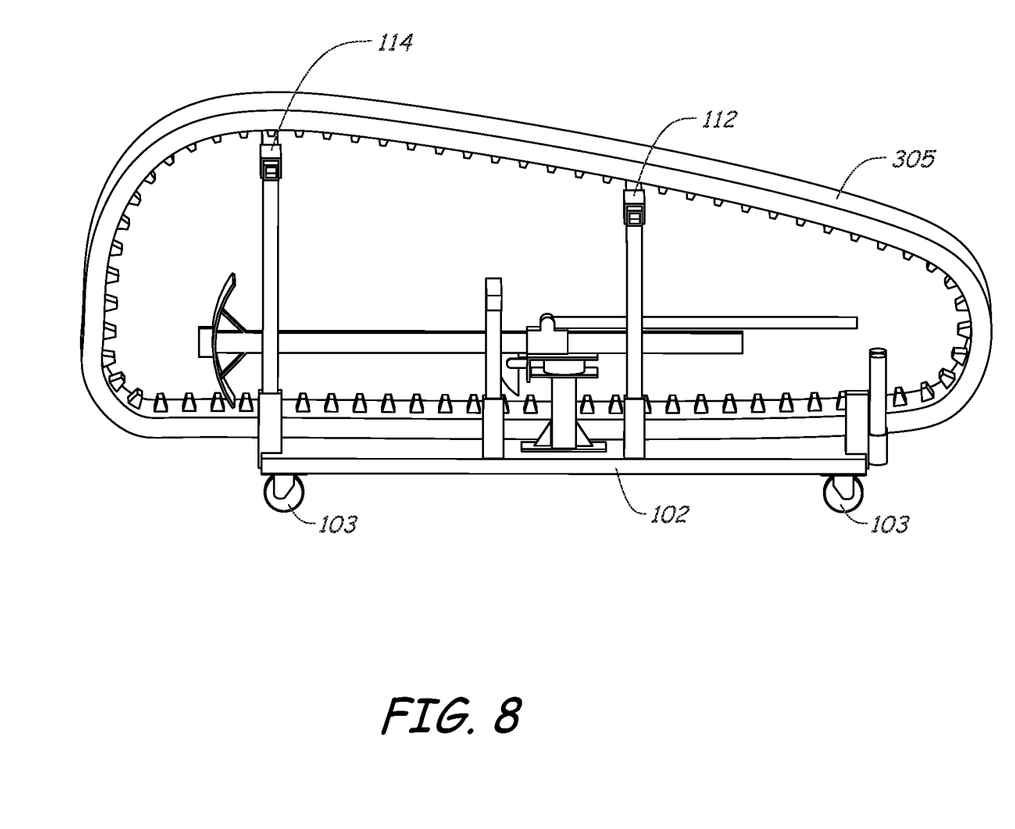
FIG. 8 is a diagrammatic illustration of the tool shown in FIG. 1 after removal of a track from a power machine.

FIG. 7 illustrates a method 400 of removing a track 305 from a track frame assembly 315 according to one illustrative embodiment. Beginning at block 405, the tracked machine is prepared for track removal. This typically includes de-pressurizing the tensioning cylinder and raising the power machine off the ground, for example by using a jack and/or jack stands. Once the power machine has been prepared, dowel pins 210 are inserted between track 305 and idler 310 of the track frame assembly to help retract the tensioning actuator by creating a force against the tensioning cylinder, as shown in block 410. Typically, the dowel pins 210 are inserted by placing them between internal cogs on the bottom of the track and actuating the track 305 to slowly move in reverse until the dowel pins are positioned between the track and the idler 310. The dowel pins 210 are shown between the idler 310 and the track 305 in FIG. 6. At block 415, base 102 of tool 100 is positioned at least partially beneath the track frame assembly 315 such that the horizontally extending members 118, 121 of one or more track hanger towers 112, 114 are positioned beneath track 305 and between the track and the track frame assembly. In FIG. 6, only track hanger tower 114 is shown, but track hanger tower 112 can also be similarly positioned. The differing heights of track hanger towers 112 and 114 allow each to be positioned between the track frame assembly and the track 305 at different positions as the geometry of track 305, when mounted on track frame 315 has a varying height. At block 420, with the one or more track hanger towers 112, 118 positioned beneath track 305, the track is removed from track frame assembly 315 and is supported by the track hanger towers as shown in FIG. 8. Removal of track 305 from track frame assembly 315 can be achieved, for example, using a bar or other tool to pry the track from the track frame assembly. Using wheels 103, tool 100 can then be used to transport the track away from the power machine.

Figure 9:
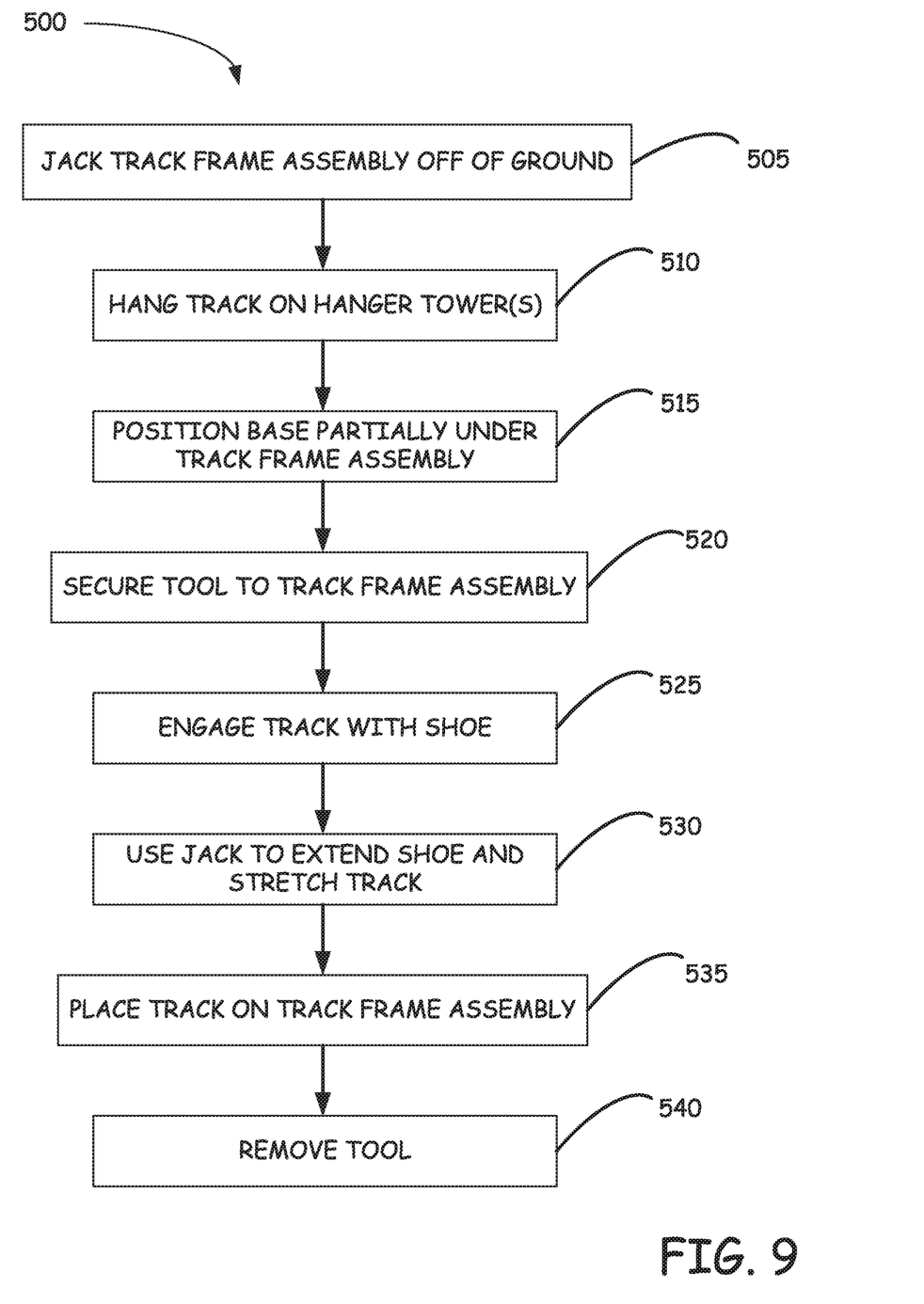
FIG. 9 is a flow diagram illustrating a track installation method in accordance with an exemplary embodiment.
Figure 10:
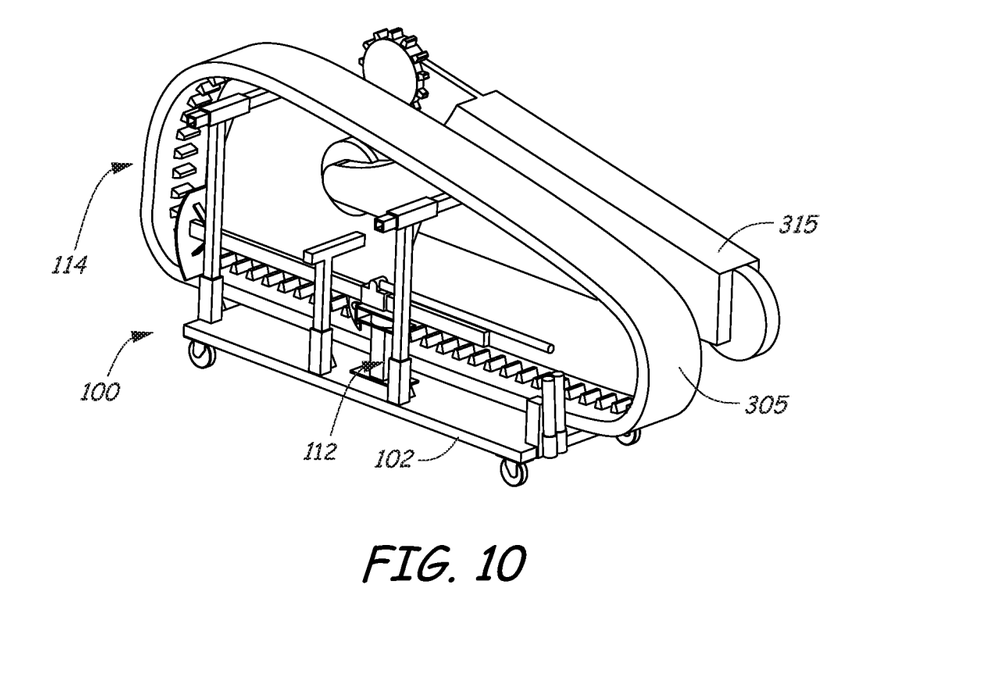
FIG. 10 is a diagrammatic illustration of the tool shown in FIG. 1 during installation of a track on a power machine.

Referring now to FIG. 9, shown is another embodiment of a method 500 of using tool 100, but this time for installation of a new track 305 onto the track frame assembly. First, as shown at block 505, the track frame assembly of the power machine is prepared for installation of a track. This preparation includes raising the power machine off the ground by, for example, using a jack and jack stand and the tensioning cylinder is de-pressurized and retracted. Typically, the method 500 will be performed after method 400 (i.e. after an old track is removed). At block 510, a new track 305 is hung on the hanger towers 112 and 114, as is shown in FIG. 10.

Figure 11:
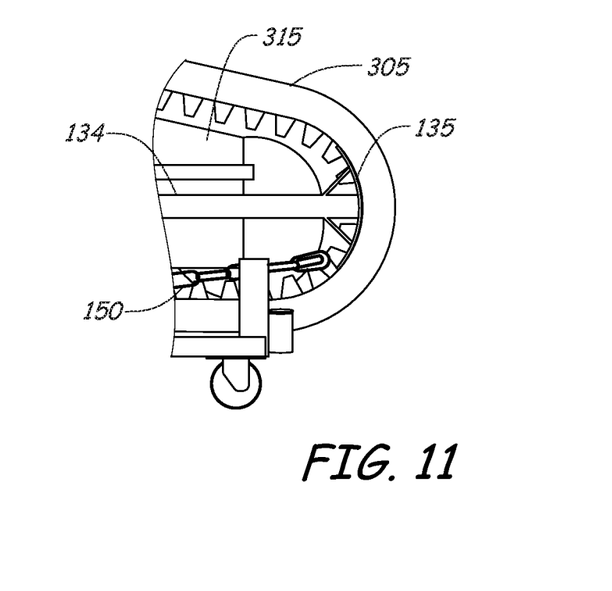
FIGS. 11 and 12 are diagrammatic illustrations showing engagement of a shoe of the tools shown in FIG. 1 with a track during installation of the track on a power machine.
Figure 12:
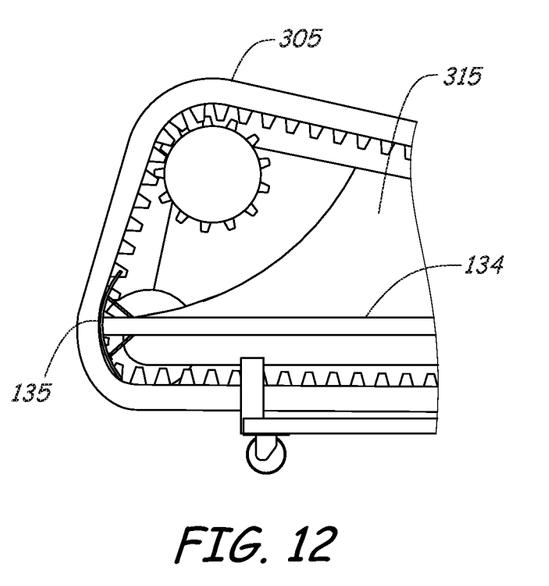

Base 102 of tool 100 is positioned at least partially beneath the track frame assembly 315 as shown at block 515. The base 102 of tool 100 is then secured to the track frame assembly such as by chain 150 as shown in FIG. 3 (wrapped around center mount 136) and illustrated in block 520. Securing the base 102 to the track frame assembly allows the shoe 135 to act against the track while grounded against the track frame. In some exemplary embodiments, securing tool 100 to the track frame assembly 315 is achieved with chain 150 shown in FIG. 3. Depending upon whether shoe 135 will be used to stretch track 305 at a front of the track frame assembly 315 as shown in FIG. 11, or to stretch the track at the rear of the track frame assembly as shown in FIG. 12, chain 150 can be connected to the same corresponding end of the track frame assembly. However, in other embodiments, chain 150 is secured to both ends of the track frame assembly, regardless of which end of the track frame assembly tool 100 will be used to stretch the track.

At block 525 shown in FIG. 9, shoe 135 is engaged with the track 305. FIGS. 11 and 12 illustrate engagement of shoe 135 with track 305 at the front and rear of the track frame assembly. Next, at block 530, track engager 130 is used to extend rail 134 and shoe 135 to stretch the track. With the track stretched, users can pry the track onto the track frame assembly and over the idlers. Finally, at block 540, tool 100 can be removed and the power machine can be lowered for any final adjustments and for use with the newly installed track.

Although the present invention has been described by referring to preferred embodiments, workers skilled in the art will recognize that changes may be made in form and detail without departing from the scope of the discussion.

What is claimed is:

1. A track mounting tool configured for use in removing tracks from, and installing tracks on, a power machine, the track mounting tool comprising:
    a base configured to be positioned adjacent a track frame of the power machine, the base having wheels to allow the base to be moved beneath the track frame; and
    a plurality of hanger towers coupled to the base and spaced apart on the base to carry a track for installation on the track frame, or after removal from the track frame, wherein each of the plurality of hanger towers comprises a vertically extending member, and a horizontally extending hanger member secured to the vertically extending member and having a length configured to extend along at least a majority of a track width of the track such that the horizontally extending member is suitable to carry the track thereon.

2. The track mounting tool of claim 1, wherein the track mounting tool further comprises a plurality of tower mounts secured to the base, each of the plurality of tower mounts configured to accept one of the plurality of hanger towers for coupling to the base.

3. The track mounting tool of claim 2, wherein each of the plurality of tower mounts is configured to removably couple one of the plurality of hanger towers to the base such that the plurality of hanger towers can be coupled to the base in different configurations for use in removing tracks from, and installing tracks on, different sides of the power machine.

4. The track mounting tool of claim 1, and wherein each of the plurality of hanger towers further includes a connection mechanism configured to detachably secure the horizontally extending hanger member to the vertically extending member.

5. A track mounting tool configured for use in removing tracks from, and installing tracks on, a power machine, the track mounting tool comprising:
  a base configured to be positioned adjacent a track frame of the power machine;
  a plurality of hanger towers coupled to the base and spaced apart on the base to carry a track for installation on the track frame, or after removal from the track frame; and;
  a track engagement mechanism coupled to the base and configured to engage and stretch the track.

6. The track mounting tool of claim 5, wherein the track engager mechanism comprises a shoe having an arcuate shape and configured to engage an inside surface of the track to stretch the track.

7. The track mounting tool of claim 6, wherein the base is configured to be positioned beneath the track frame of the power machine.

8. The track mounting tool of claim 6, wherein the track engager mechanism is coupled to the base by a center mount, and wherein the track engager mechanism further comprises:
  a rail having the shoe mounted at one end thereof, wherein the center mount is configured to support the rail; and
  a handle coupled to the center mount; and
  wherein the track engager mechanism is configured such that actuation of the handle causes the center mount to force the rail and shoe to extend away from the center mount to engage and stretch the track.

9. The track mounting tool of claim 8, and further comprising a pivot mechanism configured to rotatably couple the rail to the center mount to allow the rail to be rotated and extended in either of two directions relative to the base.

10. The track mounting tool of claim 8, and further comprising a rail guard post tower coupleable to the base, the rail guard post tower having a rail guard vertically extending member coupleable to the base, and a rail guard horizontally extending member coupled to the rail guard vertically extending member, the rail guard post tower having a height such that the rail guard horizontally extending member is positioned adjacent and above the rail when the rail guard vertically extending member is coupled to the base in order to provide an upper limit on an amount of deflection of the rail when the shoe engages the track.

11. The track mounting tool of claim 5, and further comprising a plurality of dowel pin holders coupled to the base and configured to store dowel pins for use in removal of the track from the track frame.

12. A track mounting tool configured for use in removing tracks from, and installing tracks on, a power machine positioned on a support surface, the track mounting tool comprising:
  a base configured to be positioned adjacent a track frame of the power machine, the base having wheels to allow the base to be moved beneath the track frame with the wheels of the base positioned on the support surface; and
  a track engager mechanism coupled to the base and configured to engage and stretch the track.

13. The track mounting tool of claim 12, wherein the track engager mechanism comprises a shoe having an arcuate shape and configured to engage an inside surface of the track to stretch the track.

14. The track mounting tool of claim 13, wherein the arcuate shape of the shoe has a radius of curvature which is larger than a radius of curvature of an idler of the power machine over which the track will be installed.

15. The track mounting tool of claim 13, wherein the track engager mechanism is coupled to the base by a center mount, and wherein the track engager mechanism further comprises:
  a rail having the shoe mounted at one end thereof, wherein the center mount is configured to support the rail; and
  a handle coupled to the center mount; and
  wherein the track engager mechanism is configured such that actuation of the handle causes the center mount to force the rail and shoe to extend away from the center mount to engage and stretch the track.

16. The track mounting tool of claim 12, wherein the base is configured to be positioned beneath the track frame of the power machine.

17. A track mounting tool configured for use in removing tracks from, and installing tracks on, a power machine, the track mounting tool comprising:
  a base configured to be positioned adjacent a track frame of the power machine, the base having wheels to allow the base to be moved beneath the track frame, the base further having a plurality of tower mounts positioned on and secured to a first side of the base; and
  a plurality of hanger towers configured to be coupled to the base and spaced apart on the base to carry a track for installation on the track frame, or after removal from the track frame, wherein each of the plurality of hanger towers comprises a vertically extending member configured to be positioned within one of the plurality of tower mounts on the first side of the base, and a horizontally extending hanger member secured to the vertically extending member and extending from the first side of the base to a second side of the base a distance which allows the horizontally extending hanger members of the plurality of hanger towers to carry the track thereon.

* * * * *